United States Patent [19]

Hayes

[11] Patent Number: 4,481,060
[45] Date of Patent: Nov. 6, 1984

[54] PROCESS FOR LAMINATING ARAMID WATERLEAVES

[75] Inventor: Edwin H. Hayes, Richmond, Va.

[73] Assignee: E. I. Du Pont de Nemours and Company, Wilmington, Del.

[21] Appl. No.: 214,964

[22] Filed: Dec. 10, 1980

[51] Int. Cl.$^3$ .............................................. C09J 5/00
[52] U.S. Cl. ............................ 156/309.9; 156/322; 156/324
[58] Field of Search ................... 156/62.8, 309.9, 312, 156/322, 324, 285, 286; 428/474.7; 162/132, 133, 138, 148, 149, 206, 207

[56] References Cited

U.S. PATENT DOCUMENTS

| 3,038,833 | 6/1962 | Glover | 156/322 |
| 3,302,304 | 2/1967 | Goldenberg et al. | 34/159 |
| 3,477,138 | 11/1969 | Snow | 32/23 |

FOREIGN PATENT DOCUMENTS 1129097 10/1968 United Kingdom .

OTHER PUBLICATIONS

Laminating, Fabricating and Processing of Nomex High Temperature Resistant Nylon Paper, Technical Information Bulletin N-204, Feb. 1967, E. I. Du Pont de Nemours & Co., pp. 1–4.

Primary Examiner—Michael Ball

[57] ABSTRACT

A process for combining layers of aramid waterleaves into a multi-ply structure wherein the layers are brought together in closely spaced relationship while being forwarded under low tension through a heating zone, the layers are heated, the layers are separated by mechanical means and purged by a stream of dry air to expel moisture-laden air from between the layers in a transverse direction while preventing moisture-laden air from moving along with the layers in the downstream direction, the layers are brought together, further heated and compacted under heat and pressure.

5 Claims, 2 Drawing Figures

PROCESS FOR LAMINATING ARAMID WATERLEAVES

This invention relates to a process for laminating two or more layers of aramid waterleaves to provide a uniform, unitary product.

Paper-like sheets (waterleaves) consisting of mixtures of unfused wholly aromatic polyamide (aramid) fibrids and short length aramid fibers (floc) are known. These sheets can be prepared by conventional paper-making techniques. After drying and hot calendering, these sheets are useful as electrical and thermal insulation, are fire resistant and have useful structural characteristics. For some uses, the paper-like sheets may contain mica particles as shown in British Pat. No. 1,129,097.

Fibrids are irregularly shaped particles having at least one dimension of minor magnitude relative to their major dimension and have the capability either alone or when mixed with short length fibers of forming self-sustaining waterleaves. Fibrids are further described in U.S. Pat. No. 2,999,788 column 1, line 60 to column 2, line 30. Fibrids may be prepared by shear precipitation of a polymer solution into a suitable coagulant.

When two or more sheets as described above are led simultaneously through a radiant-heat oven, it has been found that the energy penetrates the outer plies and is able to heat even the inner plies to a satisfactorily uniform temperature for proper compacting and bonding when the plies are more or less in contact with each other. However, the moisture which the heat drives out of the sheets accumulates in the air traveling between the sheets and is unable to escape. This is particularly true when the plies are very wide. In contrast to the behavior of some plied products in which moisture promotes bonding, even small amounts of moisture interfere with adhesion between plies of aramid waterleaf during hot calendering, resulting in regions of incomplete bonding which appear as blisters, bubbles or other nonuniformities in the compacted multi-ply product.

This invention provides an improved process for laminating two or more layers of aramid waterleaves by compacting the layers under heat and pressure.

BRIEF DESCRIPTION OF THE INVENTION

This invention provides a process for combining layers of waterleaves comprised of aramid fibrids and aramid floc into a unitary sheet structure whereby two or more of said layers are (1) brought together in closely spaced relationship while being forwarded under low tension through a heating zone, (2) heated, (3) separated by mechanical means, (4) purged by a stream of dry air to expel moisture laden air from between the layers in a transverse direction while preventing moisture laden air from moving along with the layers in the downstream direction (5) brought together again and further heated and (6) compacted under heat and pressure. Preferably, the layers are separated by pipe-like obstructions provided with openings whereby dry air is expelled in a generally upstream direction. The aramid waterleaves preferably are comprised of 10–90% by weight aramid fibrids and 90–10% by weight aramid floc. In a preferred process the layers in closely spaced relationship are first heated to 200°–220° C., then after purging and being brought together again further heated to 220°–270° C. and then compacted in a calendar having a roll temperature of 350°–370° C. It is preferred that the moist air be purged at a location 25–50% of the total length of the heating zone as measured from the entrance to the heating zone.

DETAILED DESCRIPTION OF THE INVENTION

Figures 1, 2:
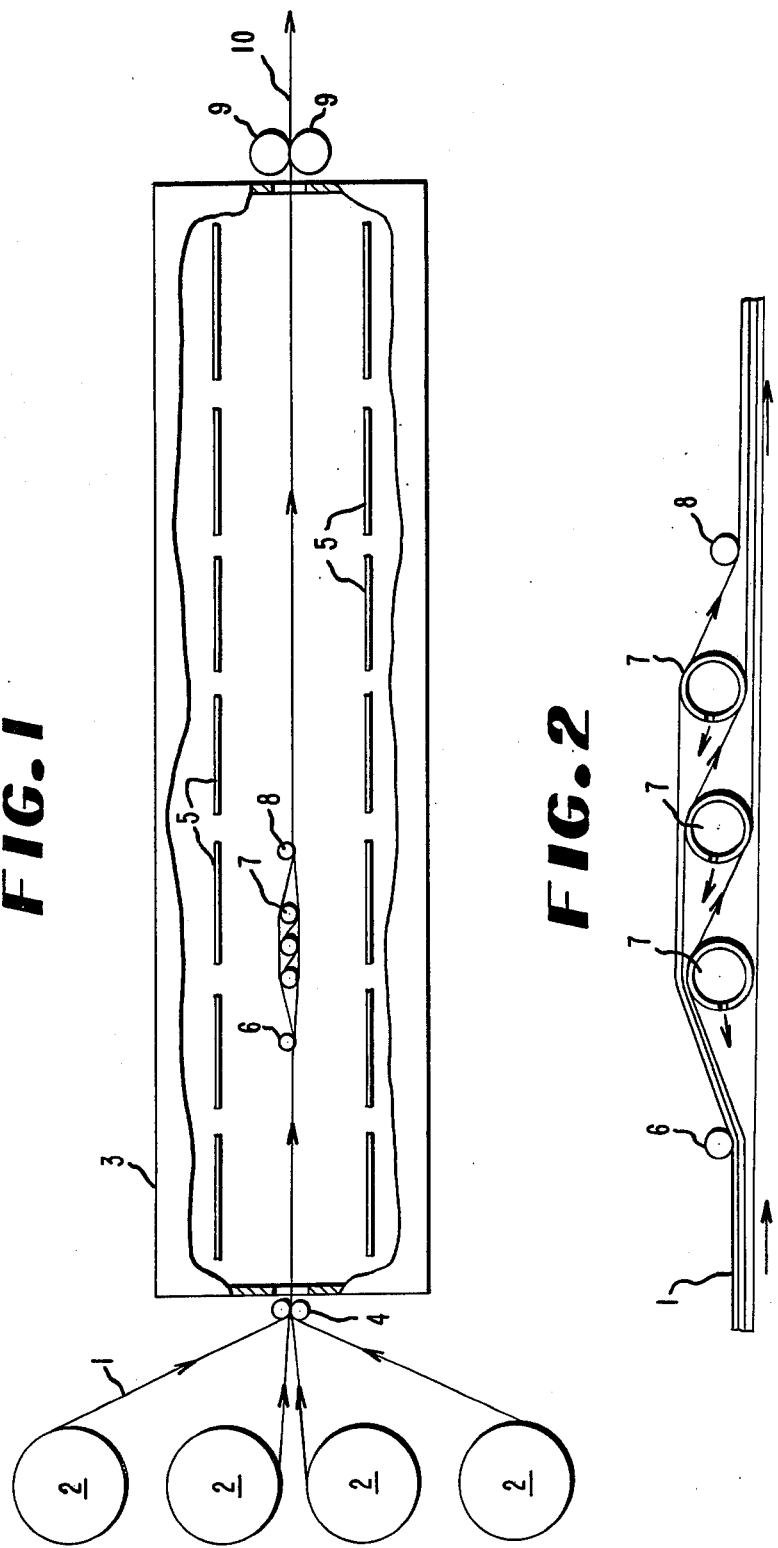
FIG. 1 is a schematic view of a process of the invention.
FIG. 2 is a detail of one method of separating plies and purging moisture-laden air from between plies of a 4-ply product.

It has been found that moisture can be satisfactorily removed from multiple sheet-like plies traveling together in close proximity while being heated, e.g. by radiant energy, in a heating zone, separating the plies, purging moisture-laden air from between the plies with drier air at least once during the travel of the plies through the heating zone, bringing the plies together again and compacting them by heat and pressure. The purging means may be one or more streams of heated air at ambient air moisture level or less to force moisture-laden air transversely from between the plies while they are separated. Alternatively, an obstruction occupying substantially all of the space between the separated plies forces moist air traveling with the plies to exit the space between the plies in a transverse direction, the space between plies on the downstream side of the obstruction being filled with drier air drawn inward between the plies by the entraining action of the traveling plies. The purging action of an obstruction may be supplmented by one or more streams of heated air directed generally upstream of the obstruction. The heated air may also be introduced downstream of the obstruction if desired.

The process of the invention not only prevents moisture-caused non-uniformities in the compacted product but permits higher operating speeds.

Referring to the figures, wide plies 1 of waterleaf are taken from supply rolls 2 and enter enclosure 3 at guides 4, which may be rollers, in approximate contact with each other. Radiant heaters 5 are spaced at suitable intervals along the length of enclosure 3, both above and below plies 1, bringing the plies up to the desired temperature and driving moisture out of the outer surfaces and also into the air between the plies. The plies are then separated at a guide 6 and the moisture-laden air is purged from between the plies by means shown here as one or more obstructions 7 located between separated plies 1, forcing the moisture-laden air which travels downstream with the plies outward toward the sides of enclosure 3. Obstructions 7 may be pipes equipped with orifices from which heated air issues in a generally upstream direction, the pipes being supplied with air from a source not shown. Plies 1 are brought back together at guide 8, and are heated further before entering hot calendar roll 9, which may be either a single pair of rolls as shown or may be a stacked set of rolls if very high pressures are necessary to compact and bond the plies.

Dryer air which has replaced moisture-laden air downstream of obstructions 7 picks up residual moisture from heated plies 1 while they are still separated, then when the air is expelled sideways from between the plies as they converge. After compacting, the dense multi-ply product 10 progresses for further treatment and/or winding. Moisture-laden air is exhausted from enclosure 3, at some location not shown.

The purging means is preferably located at a point in the heating process where all plies have reached approximately a temperature of maximum moisture release which most preferably occurs from about 25–50% of the total length of the heating zone as measured from the inlet end.

Obstructions 7 may be of any desired shape, but should preferably fill the spaces between plies 1 almost completely to block passages of moisture-laden air downstream, allowing only sufficient space between obstructions for passage of plies 1. Obstructions 7 may be arranged upstream and downstream of each other as shown in the figures, but other arrangements are obviously possible. In any case, plies 1 should preferably contact each obstruction firmly to prevent passage of moist air beyond the obstructions. If desired, air orifices may be provided in an upstream and/or downstream direction when the obstructions are also sources of air.

Spacing between plies is maintained during the heating process by additional guides as needed, and by the tension in plies 1 due to the forwarding action of rolls 9.

The efficiency of the process of this invention may be further improved by insuring that moisture-laden air purged from between plies does not enter the spaces between plies downstream of the purged location. This may be accomplished by such means as suitably located exhaust facilities, supply ducts for dry heated air, barriers to prevent mixing, or by bringing the plies into intimate contact by suitable guide bars or rollers.

What is claimed is:

1. Process for combining layers of waterleaves comprised of aramid fibrids and aramid floc into a unitary sheet structure whereby two or more of said layers are (1) brought together in closely spaced relationship while being forwarded under low tension through a heating zone, (2) heated, (3) separated by mechanical means, (4) purged by a stream of dry air to expel moisture-laden air from between the layers in a transverse direction while preventing moisture-laden air from moving along with the layers in the downstream direction, (5) brought together again and further heated and (6) compacted under heat and pressure.

2. Process of claim 1 wherein the layers are separated by pipe-like obstructions provided with openings through which dry air is expelled in a generally upstream direction.

3. Process of claim 1 wherein the layers are comprised of 10–90% by weight aramid fibrids and 90–10% aramid floc.

4. Process of claim 1 wherein the layers in closely spaced relationship are first heated to 200°–220° C., then after purging and being brought together again further heated to 220°–270° C. and then compacted in a calendar having a roll temperature of 350°–370° C.

5. Process of claim 1 wherein the separated layers are purged with dry air at a location 25 to 50% of the total length of the heating zone as measured from the entrance to the heating zone.

* * * * *